MAYNARD J. KULJIAN
INVENTOR

BY Robert H. Clay

ATTORNEY

MAYNARD J. KULJIAN
INVENTOR.

BY Robert G. Clay

ATTORNEY 3,437,795

DATA INPUT DEVICES AND SYSTEMS

Maynard J. Kuljian, Palo Alto, Calif., assignor to Ampex Corporation, Redwood City, Calif., a corporation of California Filed June 28, 1965, Ser. No. 467,494
Int. Cl. G06k 7/00; H01h 35/00; H04m 1/26
U.S. Cl. 235—61.11 4 Claims

ABSTRACT OF THE DISCLOSURE

An electronic keyboard system composed of completely electronic, capacitive sensing circuits which are responsive to manually actuated, capacitance variations. A plurality of circuit paths are provided, each including an exposed touch member, and energized with bias means such as an RF signal means. Signal variations are introduced by changing the conductance characteristics created by human contact with the touch member. A number of signal channels may be arranged to cooperate with a single sense amplifier that responds to all channels of input sources formed of, for example, a punched card reader and a manual keyboard in accordance with the invention. The use of a single sense amplifier is possible by employing both a column scanning circuit and a row sequencer which scan the card; i.e., the scanning circuit steps through the columns and the signal channels are scanned by the row sequencer. The row sequencer stops upon the detection of a data signal manifestation whereby the position of the row sequencer when stopped is an indication of the numerical value of the hole in the punched card.

This invention relates to systems and devices for providing digitally encoded signals in response to an input condition, and more particularly to manually operated input devices for data processing or communication systems, and to systems using such devices.

Since the advent of modern electronic data processing equipment, rapid and extensive changes have taken place in circuit design and system organization. Consequently, the systems have continually been reduced in size and cost, although at the same time speed and capability have continually increased. Input devices, however, have remained largely unchanged throughout this interval. Thus, for general purpose uses requiring manual data input the systems typically employ an electric typewriter with an associated paper tape puncher and reader. Keypunches and special keyboards are also widely used. These mechanisms are all generally of mechanical construction. Although they are widely used they are complex and have generally proven too costly for those applications involving low data rates or volumes. As computing and data processing systems have been reduced in cost, they have increasingly been able to reach the smaller commercial and professional businesses, and to process most of the data required by such businesses in a fashion far superior to conventional accounting procedures.

The data required to be organized and processed in a small organization such as a medical practice, for example, is of relatively very low volume and generally routine character. Information as to charges, services, and billings can therefore be handled very readily by a data processing system. Accordingly, special purpose computers, time shared systems and various special business services employing data processing systems are increasingly being directed toward handling the routine bookkeeping work of small businesses. A crucial factor in the successful operation of any such system, from the standpoint of the user organization, is the expense and difficulty involved in data collection. Once adequate data is entered into a modern data processing system the needed financial, statistical or trend data may be extracted and prepared without difficulty. Generally, however, the small organization does not desire to hire or train an individual solely for the preparation of data, and must use personnel whose training and duties are primarily in other fields. The preparation of even small volumes of data can greatly burden a small organization or office unless the data collection function is simply and directly performed.

With the foregoing in mind, there have been devised a variety of input devices for such applications. Most of these devices are now adapted also to transmit data by digital telephone units (such as the "Dataphone"), or direct wire couplings to a data processing system. Most of these input devices are designed to read punched cards, or other prepared media, and also to accept manual input data. Conventional keyboard mechanisms are seldom suitable for these purposes, not only because of cost but also because of size and a need for additional interface equipment. The new and specialized devices, moreover, do not fully satisfy the stringent requirements of cost and simplicity of operation.

Conventional keyboard arrangements tend to be too complex and expensive, even where specially designed solely for decimal data. Specialized manual input devices, such as movable lever arm systems, often are difficult for an untrained operator to use and also do not permit verification of the data which is being entered.

It will be apparent to those skilled in the art that the provision of new manual input devices for data processing systems will not only be of benefit in low cost data collection devices, but will also be applicable to higher speed and higher cost systems. Because error must be reduced to an absolute minimum, the sensing mechanism itself should not be subject to error, in whatever context it is used. The variation between the actuation and non-actuation conditions, for example, must be adequate to discriminate against disturbing factors which may be regarded as system noise. The manual input devices should not only be simple to use and low in cost, but should not change in characteristics over long intervals. They should also provide suitable response to the operator so that errors can be minimized.

It is therefore an object of the invention to provide novel input devices for data processing systems.

Another object of the invention is to provide improved means for entering digital data manually into a data collection system.

Yet another object of the invention is to provide improved low cost data collection systems.

These and other objects in accordance with the invention are achieved by completely electronic capacitive sensing systems which are responsive to capacitance variation manifestations, such as manual actuation. A plurality of circuit paths are defined, each including an exposed touch region, and the circuits are energized with bias means including an RF signal means. Significant signal variations are introduced by changing conductance characteristics created by human contact with the touch region.

Manual input devices in accordance with the invention are completely electronically operated, and therefore have the reliability and long life of electronic systems, and the versatility which electronic design affords. In a specific example of an arrangement in accordance with the invention, a number of individual circuit paths, conveniently provided by printed circuit cards, include key elements which include or are associated with capacitive elements within the circuit path. These capacitive key elements operate by means of a capacity substantially lower than that presented by the human body to ground.

The circuit paths are electrically energized, preferably with radio frequency energy although pulses may also be used, and the circuit paths also include neon or other cold cathode gas discharge elements in close coupling to each of the individual key element circuits. The gas discharge elements are arranged to be held below the firing level when the normal capacitance is in the circuit, but to discharge and thereafter remain conducting when the RF is substantially reduced by manual contact. Sensing circuits detect the resultant change in signal conditions in the individual circuit paths so that a wholly electronic keyboard providing digital output signals is thereby achieved.

In a preferred form of manual keyboard arrangement in accordance with the invention, the neon element is contained within the key element itself, and the key element is provided with a translucent portion, so that firing of the neon element provides a visual indication to the operator. The neon element is also used as a bistable element in the circuit. Further, the potential difference normally maintained across the neon element is preferably established by a bias means including an RF signal source which is effectively coupled to ground during manual contact, thereby increasing the potential difference sufficiently to cause the neon element to be fired. The keyboard switching function is implemented by sensing an RF current which flows through the fired neon.

Another aspect of input devices in accordance with the invention is the provision of features whereby an operator receives a tactile or audible response upon actuation of the key. In accordance with yet another aspect, contact with one key in a column or group causes the remaining keys to be locked out, so that reliability is improved and errors may be erased and corrected.

Data collection systems in accordance with the invention utilize perforation and manual sensing devices as above described in particularly advantageous fashion. A punched card reader and a manual keyboard are both disposed on the same unit, which may be coupled to a digital data transmitting or storge system. Interchangeable printed circuit cards may be utilized if desired, and the successive positions of either device are scanned in sequence. Output signals are generated from the perforation patterns or manual input and applied to common sensing circuits. Parallel output signals (or serial if desired) then actuate an output device or are then transmitted at an appropriate data rate for processing. In accordance with the invention, a number of signal channels may be so arranged as to cooperate with a single sense amplifier that responds to all channels of both input sources. In this arrangement, the signal channels are scanned by a sequencer that is stopped upon detection of a data signal manifestation.

A better understanding of the invention may be had by reference to the following description, taken in conjunction with the accompanying drawings, in which.

Figure 1:
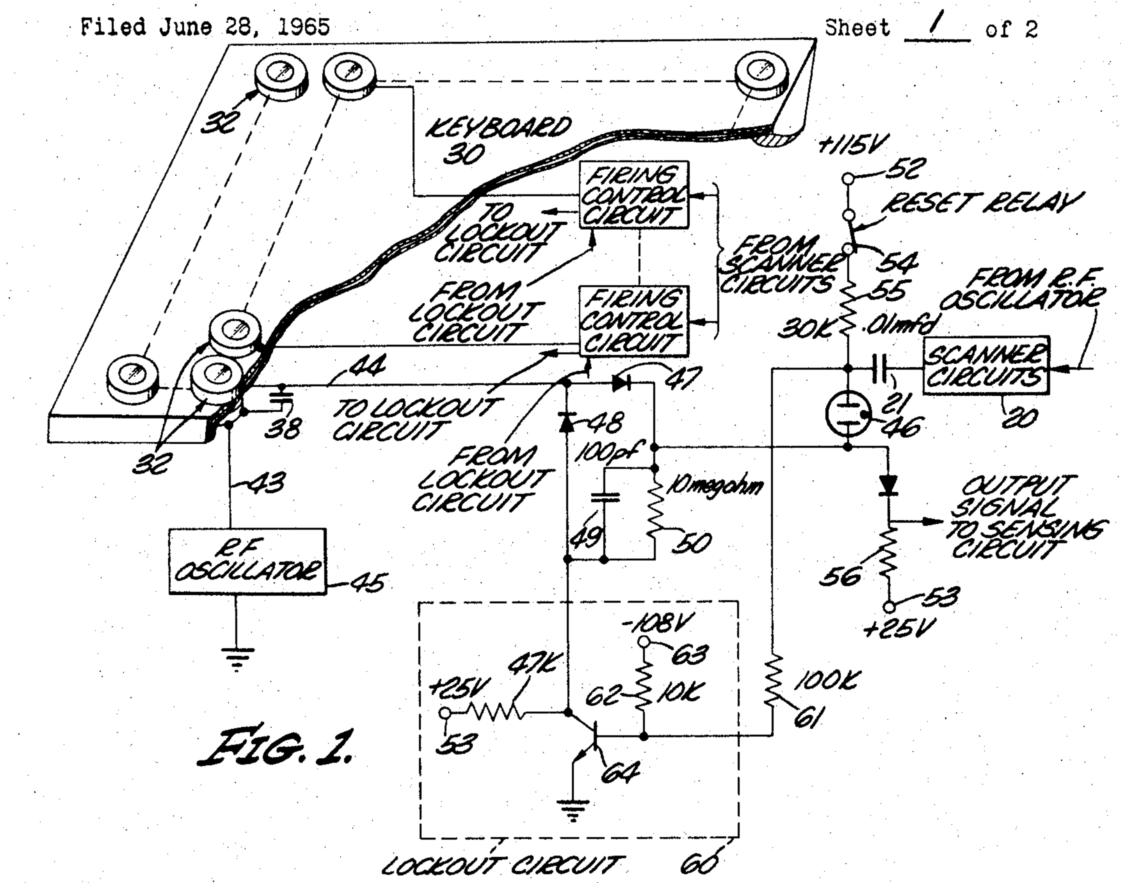
FIG. 1 is a combined perspective and schematic view, in simplified form, of a completely electronic keyboard arrangement utilizing principles in accordance with the invention.
Figure 2:
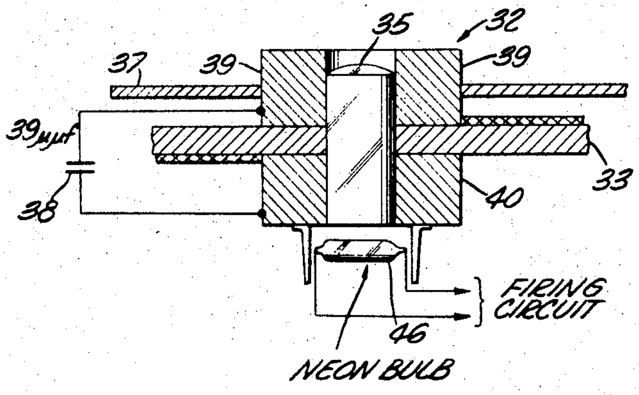
FIG. 2 is an enlarged fragmentary view of a portion of the arrangement of FIG. 1.

Application of the principles of the invention to a completely electronic keyboard arrangement are shown in the arrangement of FIGS. 1 and 2. In this arrangement only a few touch keys, referred to hereafter as key elements 32 of a keyboard 30 have been shown, for simplicity. In this particular example, although the array may be arbitrarily changed, the key elements 32 are disposed in a rectangular matrix of fifteen columns and ten rows for entry of fiteen decimal digits. Each key element 32, best seen in the enlarged view of FIG. 2, is mounted on a printed circuit board 33 and comprises a central transparent rod 35 of suitable insulating and light transmissivity characteristics such as "Lucite." A front panel 37 for the keyboard 30 covers the various circuit elements. An electrical capacitive element 38 couples a pair of conductive rings 39, 40 each encompassing the transparent rod 35 on a different side of the printed circuit board 33. In this example, the capacitive element 38 is a separate component, in close circuit relation to the exposed touch region on the key element 33. Alternatively, electrical members defining the capacitive elements as well as the key body may be disposed on each side of the printed circuit board 33. It will also be recognized that only one side of the board 33 need be utilized and that the capacitive elements can also be defined by the space between a single ring or other appropriate configuration. The use of a standard component such as the capacitive element will generally, however, be more accurate and less costly. In any event, the capacitance represented by the element 38 is much less than that of the human body, the specific value here chosen for one practical circuit being 39 micromicrofarads.

Each key element 32 is in a different firing control circuit, only one of which is shown in detail. Couplings are made through different ones of a first set of circuit conductors 43 on one side of the printed circuit board 33, these particular conductors being connected to one of the rings 40 comprising a part of the key element 32. The first set of conductors 43 is coupled to a RF oscillator 45, which supplies a signal of appropriate frequency, here approximately 250 kc., with an amplitude of approximately 30 volts, peak-to-peak. The term "RF source" or "RF oscillator" here is intended to connote a suitable source of oscillatory signals, normally at a frequency higher than the audio range, although it may be within the upper region of the audio range. Because a RF source is employed, a substantially constant frequency must be maintained. If the RF signal comprises the frequency spectrum present in a pulse, uniformity in the rise and fall times must be maintained in order for the component frequencies to be kept constant. The exposed touch portion of the key element 32 provides a capacitive coupling through the operator to ground to implement the firing control system described below.

The key element 32 also includes a cold cathode gas discharge element, such as a neon bulb 46, in close circuit coupling to the key element 32. The neon bulb 46 is physically disposed under the transparent central rod 35 in the key element 32, so that when fired the neon provides a visual indication of actuation.

The potential maintained across the neon bulb 46 is normally insufficient to cause it to be fired. The potential which inhibits the neon from firing is obtained from the rectified voltage derived through the RF oscillator 45 (in the absence of external contact) by a pair of diodes 47, 48 forming a voltage doubler power supply with a load resistor 50 and a filter capacitor 49. A selected DC bias is established across the neon bulb between a +115 volt source 52 and the inhibit voltage. A +25 volt source 53, a current limiting resistor 55 and a load resistor 56 are also included in the circuit of the neon bulb 46.

Each bank of neon bulbs corresponding to a different column of the keyboard 30 is also coupled to a separate reset relay 54 comprising a switch in series with the +115 volt source 52. The relay 54 may in conventional fashion be activated by an operator in the event of an erroneous entry in the column, and activated automatically upon the completion of the scan of a key column. The output signal taken from this firing control circuit is derived from the load resistor 56. The output signal is an RF signal, however, because of the application of signals to the neon 46 circuit from the RF oscillator 45 during scanning. The scanner circuits 20, which may comprise the circuits described below in conjunction with FIG. 3, apply RF from the oscillator 45 to the row positions within a column through capacitors 21. The RF signals may be applied in sequence within a column, or concurrently, as desired for system purposes, and the designation "scanner circuits" is to be considered as referring to any such arrangements. The RF signal variation which indicates that the neon bulb 46 has been fired is applied to conventional sense amplifier circuitry. The sensing circuits may comprise any of a number of conventional arrangements for detecting a unique signal variation in a normally steady state condition. One form of circuit suitable for this purpose comprises a threshold detector activated by a signal excursion of appropriate sense and in excess of a selected amplitude. Another arrangement comprises a peak detector circuit. In any event, the signals typically are applied through a preamplifier to the signal responsive element (threshold or peak detector) and then actuate a monostable multivibrator or other pulse generator to provide the desired digital output signals.

This arrangement comprises an extremely simple and reliable electronic keyboard which merely requires manual contact with a key element 32 for actuation. Body capacity is sufficient so that when external contact is made with the key element 32, the RF oscillator is effectively coupled to ground. The rectified voltage obtained through the voltage doubler diodes 47, 48 is substantially reduced, and the potential difference across the neon bulb 46 is increased. This increase in potential is sufficient to make the potential difference adequate to fire the neon bulb 46. Adequate voltage is supplied to maintain conduction despite removal of body capacitance and return of the voltage derived from the RF oscillator 46 to its previous level. The fired condition is maintained until the neon bulb 46 is extinguished manually or automatically by the reset circuit 52. With the arrangement shown, the touch contact reduces the voltage at the voltage doubler side of the neon 46 from approximately +25 volts to ground, in firing the bulb.

The system also includes a lockout circuit 60, for blocking actuation of more than one neon 46 in a column. A circuit coupling from the more positive side of each neon 46 is made through a resistor 61, forming a network with like circuits and a resistor 62 and −108 volt source 63. When no neons 46 are conducting, the base of an NPN transistor 64 is held slightly negative, so that the transistor 64 normally conducts. Thus the collector-emitter circuit of the transistor 64, to which the voltage doubler power supply is coupled, forms a low impedance path to ground. Grounding of the touch portion of any one key element 32 in the column, therefore, acts to drive the less positive side of the neon 46 toward ground, firing it as above described.

After firing, however, the neon potential appearing at the coupled resistor 61 lowers, shifting the level at the base of the transistor 64 slightly negative, and turning off the transistor 64. Thus the collector potential rises toward the level of the coupled +25 volt source 53, and all the firing control circuits of the column are thereafter inhibited from dropping to a lower level. Consequently, inadvertent contact with a different key element does not result in erroneous firing.

The advantages of completely electronic operation are of paramount importance in at least two respects. The system is virtually free of the wear and irregularity which attend electromechanical systems. It is also far simpler and therefore much less costly than these prior art systems. An important further consideration is that a new type of system operation becomes possible because of extremely light manual contact required. Much higher speeds can be attained than with systems requiring key depression. In addition, the visual indication is concurrently provided so that an error check can also be made. It will be recognized that a substantial number of other operative features can be included, if desired. If desired, the firing of a neon can actuate some other form of indicator, either audible or visual so as to enhance operator control.

Figure 3:
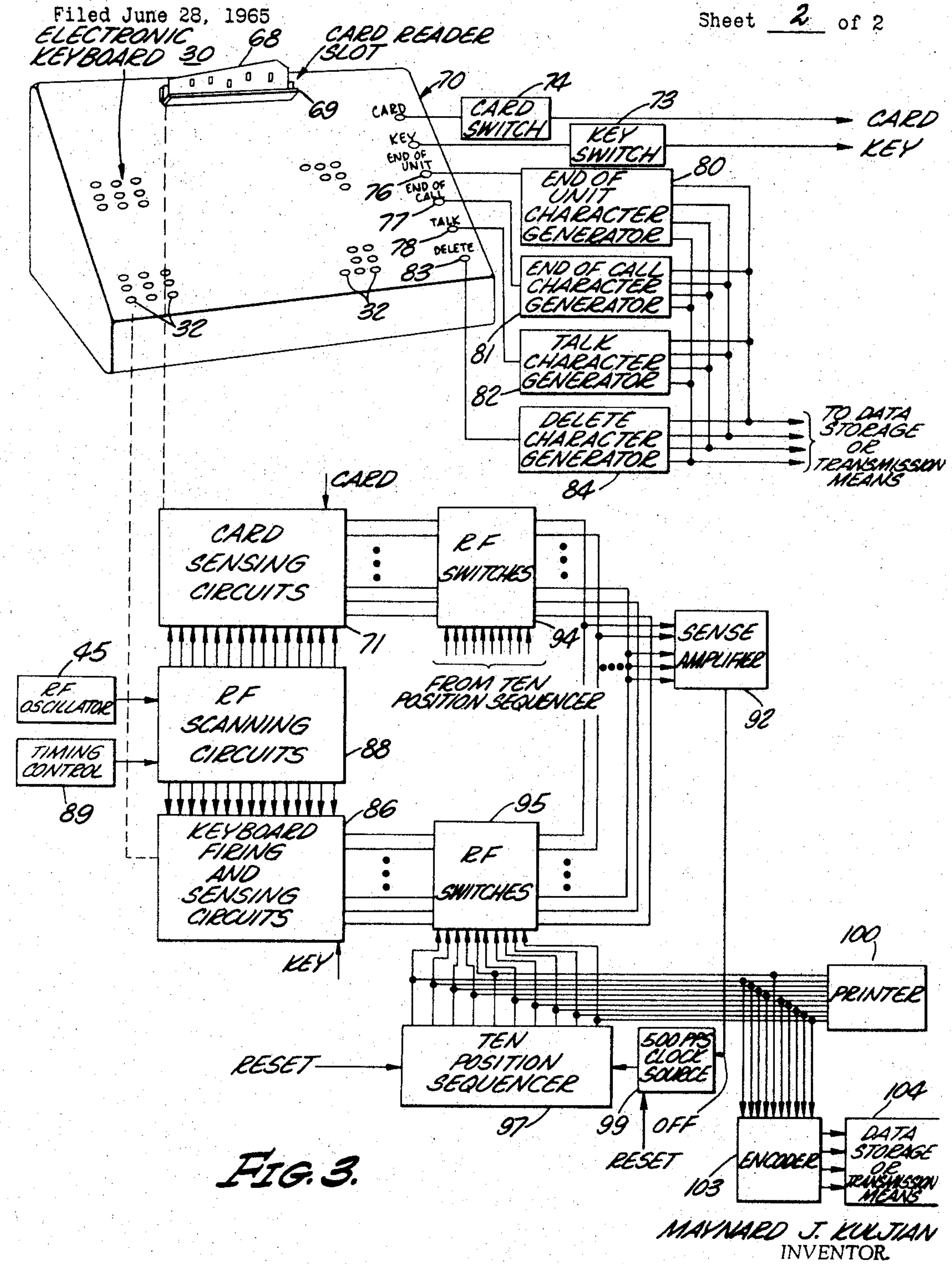
FIG. 3 is a combined block diagram and schematic representation of the arrangement of a data collection system in accordance with the invention.

A low cost data sensing system utilizing the features of the system of FIGS. 1 and 2 is illustrated in FIG. 3.

The control units for scanning the input sources and generating output data for transmission have been indicated only in block diagram form. Certain additional functions typically found in "Dataphone" and like installations have not been shown in detail, inasmuch as these are conventional. These include the "interlock," "reverse channel," and "answer back" functions, among others. It is preferred for the present example to provide a data collection unit 70 capable of accepting data both from a record member 68 and from manual actuation. The record member 68 usually, for such systems, comprises a perforated card, encoded in a Hollerith or comparable conventional code, or edge punched, or encoded in some other manner. In the most widely used code, the decimal digits are represented by punched holes at successive individual perforation positions. Fifteen numeric characters are sufficient to represent most of the fixed data (client's account number, date, customer identification or the like) needed for typical low data rate acquisition systems. Thus fifteen fixed numerical data characters provided in a one-out-of-ten position code on a punched card 68, and fifteen manual input numerical characters provided by keyboard 30 are illustrated by way of example. It will be recognized that conventional 80 or 100 character cards, or other media, may be used, and that the system may be extended to include alphabetic data.

It is also preferred, in the present example, to use a punched card reader of the capacitive type, employing the same RF signal as is used for the keyboard system 30 to energize the card sensing circuits 71. Such a system for example, may comprise a matrix of capacitive elements juxtaposed across the individual punch positions, with the elements in successive columns being energized successively, as described below.

Utilizing sensing systems in accordance with the invention, the control console 70 is provided with a card receiving slot 69, for reading perforated cards having 15 characters of 10 decimal digits each in this specific example. An electronic keyboard 30 having 15 columns of 10 characters each for manual input is included on the same control panel. "Key" and "card" switches 73, 74 respectively are disposed on the keyboard for initiating automatic transmission of the card and keyboard derived characters in sequence. Additional control functions are provided by "end of unit," "end of call" and "talk" keys 76, 77, 78 respectively. The "end of unit" key 76 actuates a corresponding character generator 80 to transmit a selected code character. As in prior art systems, this character is utilized at the central station to initiate error checks on previously transmitted data and to reurtn an "error" signal or a "ready" signal for operator instruction. The "end of call" key 77 generates a selected code character by activating a circuit 81, to terminate the transmission, whereas the "talk" key 78 operates a character generator 82 to signal that a voice communication is desired. A "delete" key 83 and a corresponding delete character generator 84 are provided to indicate that an immediately previous communication was erroneous and is to be ignored by the systems. All of these keys are preferably of the "touch" type previously disclosed. Inasmuch as these functions are utilized in conjunction with prior art systems for "Dataphone" use, they need not be discussed in detail here.

The card sensing circuits 71 and the keyboard firing and sensing circuits 86 thus each have a matrix of positions defined by rows and columns. It is preferred, during reading, to energize the successive columns in sequence. For this purpose, the RF oscillator 45 is coupled to the columns successively by scanning circuits 88 operating under conventional timing control circuits 89, it merely being required to energize the columns from one to fifteen when either the "card" or "key" switch is operated. Instead of ten sense amplifiers, however, the present system permits use of but a single sense amplifier 92. The separate channels of the card sensing circuits 71 and keyboard circuits 86 are isolated from each other by two sets of RF switches 94, 95 and all are coupled to the sense amplifier 92. These may be electronic RF switch circuits or reed relays, although the former are preferred. Depending upon whether cards or keys are being sensed, the ten row positions of each column are scanned in sequence, under control of a ten position sequencer 97, which may comprise any conventional stepping arrangement such as a counter and decoding circuits. A 500 pulse per second clock pulse source 99 advances the sequencer 97 for each column, but is arranged to be gated off and on by signals from the sense amplifier 92 and system reset pulses respectively. An astable source of 500 p.p.s. may be used, of course, with the gating being controlled by a flip-flop and AND gate combination (not shown).

Instead of using parallel sense channels and then decoding, therefore, this system much less expensively merely converts the data at successive sensing positions to a time-varying equivalent, passing all the data through the single sense amplifier 92. The time of occurrence of a data manifestation during scanning of a column "locks up" the sequencer 97, which correctly indicates the numerical value represented. This indication may control a printer 100 or other recorder directly, or may be converted to a binary or modified binary code in encoder circuits 103 and then communicated to data storage or transmission means 104. That is, the scanning circuit 88 steps through each of the columns in succession, wherein each row along the column is then scanned by the sequencer 97. If no indication of a data manifestation (e.g., a hole in the card) is found, the sequencer 97 steps to the next row along the column, and no output is derived from the sense amplifier 92. However, if a data manifestation is sensed, the sequencer is stopped via an output signal from the single sense amplifier 92, which output in turn is fed to the clock pulse source 99 to gate the sequencer 97 off as described above. The row on which the data manifestation occurs thus is numerically indicated by the position of the sequencer 97 when it locks up, or stops, and the output from the sequencer 97 is fed to the printer 100, the encoder circuits 103 and the data storage or transmission means 104.

While there have been described above and illustrated in the drawings various forms of data input devices, and systems utilizing such input devices, it will be appreciated that the invention is not limited thereto, but includes all variations and modifications falling within the scope of the appended claims.

What is claimed is:

1. An electronically responsive manual keyboard system comprising: a plurality of circuit key elements, each of the key elements including an exposed touch portion and means providing an electrical capacitive element having a value of approximately 40 micromicrofarads; a plurality of separate conductive circuit means, each including a different key element in its circuit; a plurality of neon gas discharge elements; a plurality of voltage doubler circuits coupling each of said key elements to a different one of said neon gas discharge elements; RF signal source means coupled to each of said key elements and therefrom to the voltage doubler circuits and gas discharge elements; DC bias signal source means coupled to said gas discharge elements; the potentials of the bias signal source means and the RF signal source means providing a potential difference across the gas discharge elements normally insufficient to fire said gas discharge elements; the presence of a body capacitance in circuit with the key element draining the RF signal source potential to increase the potential difference across the neon gas discharge element to above the firing potential; lockout circuit means coupling each of said gas discharge elements of a selected group to the voltage doubler circuits of said group; and means coupled to the gas discharge elements for sensing the firing thereof.

2. The invention as set forth in claim 1 above, wherein the lockout circuit means for the selected group of gas discharge elements comprises resistive network means coupled to each of the gas discharge elements of the group, voltage supply means coupled to said resistive network means, and cooperating therewith to maintain a circuit junction at a selected potential, and normally conducting transistor means coupled to the circuit junction and to normally provide a low impedance to ground to the voltage doubler circuits of said group, and coupled to become nonconducting and to maintain the voltage doubler circuits of the group at a voltage level at which the non-fired gas discharge elements will not fire, subsequent to the firing of any one gas discharge element.

3. A data collection system for providing a data indication representative of an input manifestation provided in a one-out-of-a-number code at a number of parallel sensing positions comprising: controllable means coupled to the number of sensing positions for electrically scanning the sensing positions, a single sensing means coupled to the cotrollable means for detecting signal variations representing the occurrence of a particular input manifestation, advanceable sequencing means responsive to clock pulses and coupled to control said controllable means and gated clock means coupled to be turned off in response to the signal variations from said single sensing means and controlling said sequencing means, said gated clock means to stop said sequencing means at a position corresponding to the position at which the input manifestation occurred, said sequencing means to deliver an output indicative of the position of the input manifestation only when the sequencing means is stopped.

4. An electronic keyboard system comprising: card sensing circuits of the RF energized capacitance responsive type for sensing the perforation patterns in a matrix of rows and columns of a card; a matrix of key elements including exposed touch portions; sensing circuits including RF energizing means coupled to the matrix of key elements; RF scanning means coupled to said card sensing means and said key sensing means for selectively applying RF energizing signals thereto; RF switching means coupled to each of said sensing menas, to receive signals provided from one group of signal channels from each of said sensing means; controllable sequencing means for successively activating said RF switching means; gated clock means controlling said sequencing means and being terminable in operation in response to a control signal; and a single sense amplifier means coupled to said RF switch means and responsive to signal manifestations in any of the then active signal channels provided from said RF switch means, and coupled to provide a control signal to said gated clock means.

References Cited

UNITED STATES PATENTS

| | | | |
|---|---|---|---|
| 2,659,533 | 11/1953 | Quinby et al. | |
| 3,081,594 | 3/1963 | Atkins et al. | |
| 3,189,731 | 6/1965 | Bowman | 235—61.116 |
| 3,200,240 | 8/1965 | Hammel | 235—61.111 |
| 3,274,345 | 9/1966 | Ham et al. | |
| 3,281,541 | 10/1966 | Learner | 179—90.3 |

MAYNARD R. WILBUR, *Primary Examiner.*

SOL SHEINBEIN, *Assistant Examiner.*

U.S. Cl. X.R.

179—90; 200—52